Sept. 8, 1959  J. H. SCHACHTE  2,903,230
AUTOMATIC WEIGHING AND LOADING APPARATUS
Filed Dec. 21, 1953  2 Sheets-Sheet 1

INVENTOR
John H. Schachte

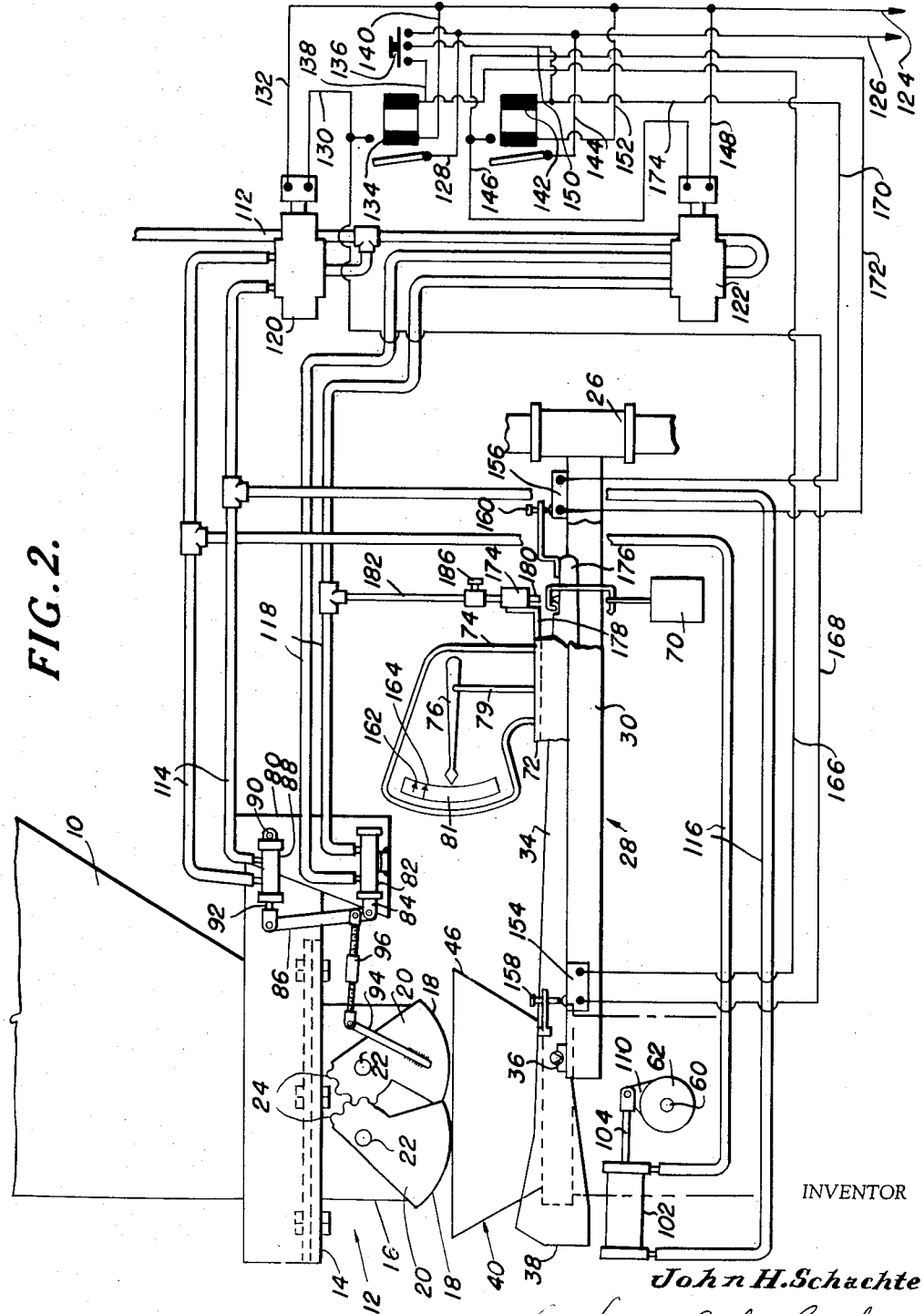

United States Patent Office 2,903,230
Patented Sept. 8, 1959

2,903,230
AUTOMATIC WEIGHING AND LOADING APPARATUS

John H. Schachte, Charleston, S.C.

Application December 21, 1953, Serial No. 399,261

20 Claims. (Cl. 249—58)

The present invention relates to an improved weighing and loading machine, and more particularly to a sacking scale wherein an open-bottom hopper constituting the load holder of a weighing scale is adapted to have the mouth of a bag detachably secured thereto for suspension therefrom and wherein the thus-arranged hopper is disposed beneath the valve-controlled gravity discharge spout of a storage bin.

More specifically, this invention relates to improvements in the weighing and loading machine disclosed in my copending application Serial No. 295,269, filed June 24, 1952, entitled "Automatic Weighing Loader," now Patent No. 2,790,619. In that machine the bag is secured to the hopper by clamps which are automatically released and the filling valve closed when a predetermined weight of material has been received in the bag. It has been found in actual practice, however, that the clamp-releasing and valve-closing mechanism occasionally is prematurely operated by a sudden surge of material into the bag caused by the breaking down of a bridge or arch of the material in the storage bin spout. Frequently, this action resulted in certain bags being considered filled when actually they contained less than the desired weight of material. Further, when a partially-filled bag is prematurely released from its suspended position on the hopper, it is most difficult and sometimes impossible for the operator to resuspend the bag on the hopper for completing the filling operation. Hence, either assistance in performing this task is usually required or the partially-filled bag is rejected.

In the machine disclosed in the aforementioned application, the valve on the storage bin spout is operated from fully-open, to dribble, to fully-closed positions as the weight in the bag approaches and then reaches a predetermined weight. The valve is operated by two power cylinders controlled by movements of the scale beam. Although this valve-operating mechanism has been eminently satisfactory in actual commercial usage, minor weighing inaccuracies occasionally occur, especially when handling free and rapidly-flowing material, such as certain types of grain.

Accordingly, it is an object of this invention to provide a weighing and loading machine of the type described with means for eliminating the possibility of prematurely closing the filling valve and releasing a bag because of a sudden surge of material into the hopper occasioned by the breaking-down of a bridge or arch of the material in the supply bin.

Another object of my invention is to provide an automatic weighing and loading machine of the type described with an improved and more accurate valve-operating mechanism for (1) effecting partial closing of the filling valve to permit a dribble flow of material, actuated by a weight of material in the container slightly less than a predetermined filled weight, and (2) for effecting complete closing of the valve when the container has received the predetermined filled weight.

A further object of my invention is to provide an improved automatic weighing and loading machine of the type described which will achieve both speed and accuracy in loading operations and which will possess ease of operation and economy of manufacture.

Other objects and advantages of this invention will become apparent from the following description and accompanying drawings, in which:

Figure 2 is a schematic view of the electrical and pressure fluid controls of the machine illustrated in Figure 1.

Figure 1:
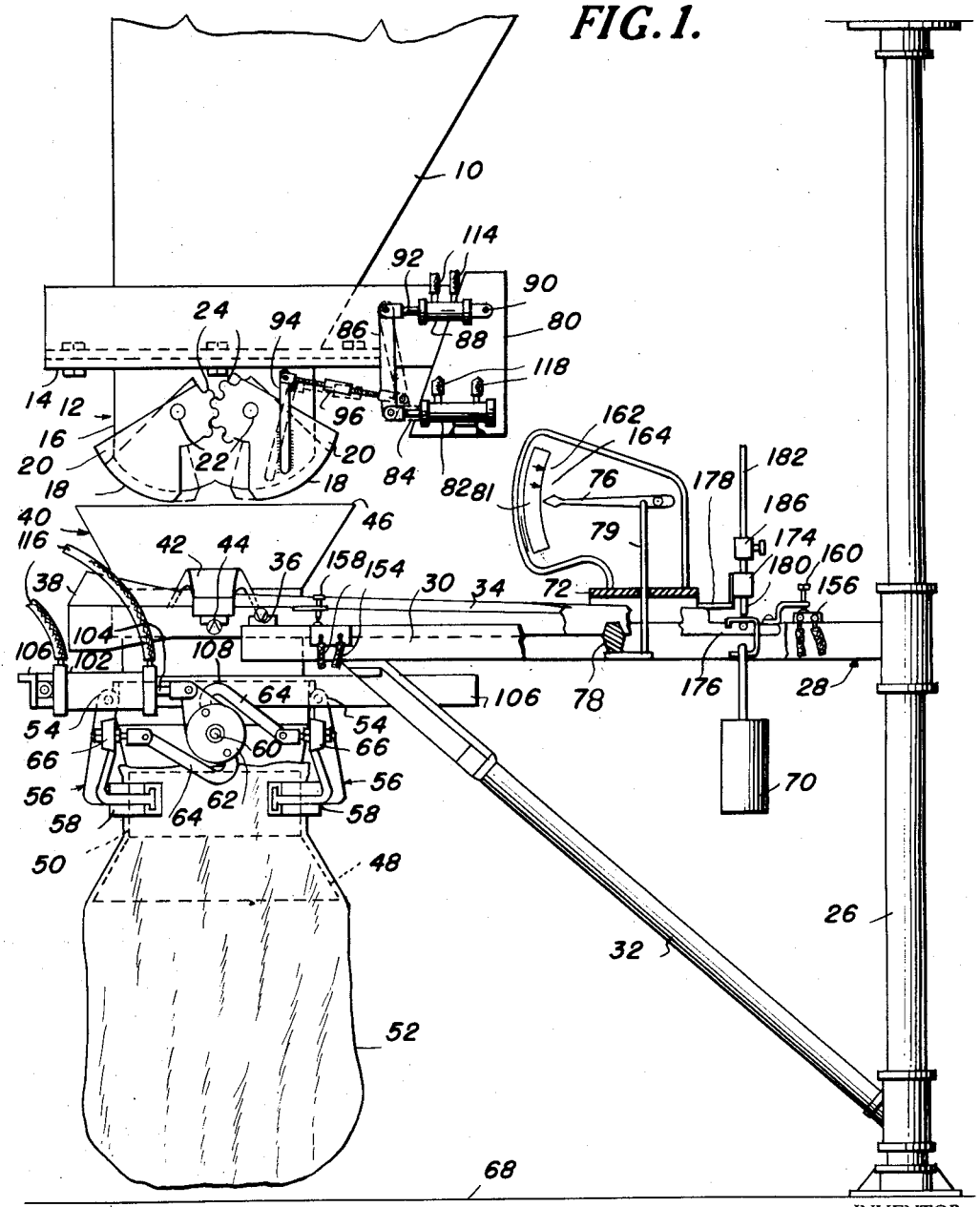
Figure 1 is an elevational view of an automatic weighing and loading machine embodying my present invention and illustrating a bag clamped to the neck of the loading hopper and the filling valve in open position to allow material to flow into the hopper to load a bag. Portions are cut away to ilustrate details more clearly.

With reference to the drawings, the basic loading and weighing machine of my present invention is similar to the loading and weighing machine disclosed in my above-identified copending application, and comprises the gravity-discharge spout 10 of a storage bin (not shown) having a conventional filling valve 12 detachably secured thereto, as by a bolted flange type of connection indicated at 14. The filling valve 12 provides a tubular extension 16 for the spout 10 with the lower end of such extension shaped to be covered and uncovered by two valve members or plates 18. The valve members 18 have side flanges 20 which are mounted on pivot pins 22 on opposite sides of the extension 16 for pivotal movement about transverse spaced parallel axes. The thus-mounted valve members 18 are interconnected by intermeshing segmental gear portions 24 on their side flanges 20, so that movement of one valve member results in corresponding movement of the other member.

Mounted on a supporting post 26, to one side of discharge spout 10, is a horizontal weighing scale frame 28, substantially U-shaped in plan view and with its outwardly-extending arms 30 supported by braces 32 extending from the outer ends thereof to the bottom of the post. The beam 34 of the weighing scale is supported by knife edge pivots 36 which rest on the frame arms 30. While only one pivot 36 is shown, it will be understood that a pivot 36 is utilized on the other side of the scale. The structure of the scale will be more readily apparent by reference to my copending application. The beam 34 is of substantially Y-shaped construction in plan view with the outer ends of such Y integrally connected by an arcuate portion 38. A filling hopper 40 is cradled in beam 34 by lateral arms 42 on the hopper, which extend over the beam and rest on knife edge pivots 44 on outer sides of the beam outwardly of the beam pivots 36. By means of this construction, it will be seen that the filling hopper 40 will be maintained in vertical position upon rocking movements of the scale beam 34.

The upper open end 46 of the filling hopper 40 is substantially funnel-shaped, as shown, and disposed beneath the valve 12, while the lower open end 48 of such hopper flares outwardly from a lower necked portion 50 for the reception of the mouth of a bag 52 thereover. Pivotally mounted on radial lugs 54 on opposite sides of the hopper 40 are bag clamps 56, each provided with an arcuate bag-engaging jaw 58, preferably covered with rubber or the like, for firmly clamping the mouth of a bag in filling position on the neck portion 50 of the hopper. Mounted on the opposite ends of a shaft 60 extending diametrically through the hopper 40 and parallel to the pivotal axes of the clamps 56 are toggle members 62, only one of which appears in the drawings. Each toggle member 62 is adjustably connected by links 64 to the ends of transverse arms 66 on the clamps 56, so that rotation of the shaft 60 serves to operate the toggle mechanism to release or to set the clamps to secure a bag in filling position on the neck 50 of the hopper 40 with the bottom of the bag a short distance above the floor 68.

On the other end of the scale beam 34 is an adjustable weight 70 to balance the beam upon the filling of a bag with a predetermined weight of material. Mounted on a bridge 72 spanning the arms 30 of the scale frame 28 adjacent the weight end of the scale beam 34 is a dial housing 74 having an indicator arm 76 mounted therewithin for pivotal movement about a horizontal axis. The arm 76 is connected to a transverse scale beam member 78 by a rod 79, whereby movements of the beam are transmitted to the arm 76 to indicate upon the dial 81 whether the weight of material within a bag 52 is over or under a predetermined weight for which the scale is adjusted. The weight of material flowing into the bag 52 from the filling spout 10 gradually swings the indicator arm 76 clockwise. Since detailed refinements of the scale constitute no part of this invention, they are not disclosed herein.

The filling valve 12 and the bag clamps 56 are operated by power cylinders. As shown in Figure 1 and also in Figure 2, a bracket 80 is secured to the bolted flange connection 14 between the valve 12 and the bin spout 10. Fixed on the bracket 80 is a horizontal power cylinder 82 disposed above and to one side of the pivotal axis of one of the valve plates 18 substantially in the plane of one of its side flanges 20. The cylinder 82 is provided with a projecting piston rod 84 having its outer end pivotally connected to the lower end of a generally-vertical lever 86. Disposed above the cylinder 82 is a generally-horizontal power cylinder 88 having one end thereof pivotally connected, as at 90, to the bracket 80 for swinging movement of the cylinder 88 on a horizontal axis parallel to the pivotal axes of the valve plates 18. The cylinder 88 also has a projecting piston rod 92, the outer end of which is pivotally connected to the upper end of the lever 86. A bracket arm 94 is secured to the side flange 20 of the valve plate 18 nearer the cylinders 82 and 88 and extends generally upward above the pivotal axis of that plate. An adjustably-extensible link 96 connects the upper end of the arm 94 with the lever 86 at a point on the latter between the pivotal connections of the piston rods 84 and 92 thereto but nearer the pivotal connection of the piston rod 84.

When the rods 84 and 92 of both power cylinders are extended, the valve plates 18 are open, as shown in Figure 1. Retraction of the piston rod 84 pivots the lever 86 about its point of pivotal connection with the piston rod 92 and rotates the nearer valve plate 18, through the link 96 and arm 94, to almost close the valve plates so that only a dribble flow can take place therethrough. Retraction of the other piston rod 92 pivots the lever 86 about its point of pivotal connection with the piston rod 84 to completely close the valve plates.

By reason of the above linkage arrangement, power cylinders having extremely short strokes of their piston rods can be employed. For example, the rod 92 can have only a one-inch stroke and the rod 84 a two-inch stroke, as contrasted to four-inch strokes for both of the valve-operating power cylinders disclosed in the aforementioned application. Obviously, short-stroke cylinders reduce the time required to move the valve plates 18 between their several positions, and rapid valve movement increases the weighing accuracy of the machine.

As schematically illustrated in Figure 2 and more fully set forth in my above-identified application, another power cylinder 102 having a projecting piston rod 104 is pivotally mounted on a rectangular frame 106 mounted on a shoulder 108 of an intermediate portion of the filling hopper 40. The piston rod 104 is pivotally connected to a radial lug 110 on the toggle member 62 so that operation of the cylinder 102 serves to set or to release the bag clamps 56.

Referring particularly to Figure 2 of the drawings, it will be seen that power fluid for operating the cylinders 82, 88, and 102 may be supplied through a conduit 112 from any appropriate source of fluid under pressure, such as compressed air. Operating fluid is supplied to and exhausted from the opposite ends of the power cylinders 88 and 102 by flexible conduits 114 and 116 leading from a solenoid-operated conventional four-way control valve 120 which is connected to the conduit 112. When the solenoid valve 120 is energized, the power cylinder 88 is operated to extend its piston rod 92, and the cylinder 102 to retract its rod 104 to set the bag clamps 56, as shown in Figure 1. The admission and exhaust of pressure fluid to and from the opposite ends of the power cylinder 82 is accomplished via flexible conduits 118 and is controlled by another conventional solenoid-operated valve 122 connected to the conduit 112. The valve 122 when energized operates to extend the piston rod 84. Both solenoid valves 120 and 122 are spring-biased for operation in the opposite direction upon deenergization thereof.

Electrical power for energizing the solenoid valves 120 and 122 may be obtained from any appropriate source and is supplied through the main conductors 124 and 126. Connected in series across the main conductors 124 and 126, by conductors 128, 130, and 132, are the normally-open contacts of a relay 134 and the energizing coil of the solenoid valve 120. The energizing coil of the relay 134 and a normally-open push-button switch 136 are connected in series across the two main conductors 124 and 126 by conductors 138 and 140. Another relay 142 is provided and its normally-open contacts and the energizing coil of the solenoid valve 122 are connected in series across the main conductors 124 and 126 by conductors 144, 146, and 148. The energizing coil of the relay 142 and the normally-open push-button switch 136 are also connected in series across the two main conductors 124 and 126 by conductors 150 and 152. Relays 134 and 142 are responsive through respective switches 154 and 156 actuated by the scale to conditions of weight carried by the scale and, in turn, control the cylinders 82, 88, and 102 in a manner to be presently described.

The switches 154 and 156 are carried by the scale frame 28 and are engaged and closed by adjustable pins 158 and 160 carried by the scale beam 34 when the beam is unbalanced by the weight 70, i.e., when there is no weight in the bag 52. The pin 158 is so adjusted that it disengages and opens the switch 154 at the exact instant the indicator arm 76 pivots upwardly to a point 162 on the dial 82 corresponding to a predetermined weight of material contained within a bag clamped to the filling hopper 40. The predetermined weight may be, for example, 100 lbs., with which weight a series of bags are adapted to be filled. The other pin 160 is so adjusted that it disengages and opens the switch 156 when the indicator arm 76 pivots upwardly to a point 164 somewhat in advance of the point 162. It thus will be seen that the switches 156 and 154 are opened in succession as the indicator arm 76 approaches and arrives at the predetermined weight indication.

Switch 154, the contacts of relay 134, and the coil of the latter are connected into a holding circuit for the relay 134 by the conductors 140, 166, 168, and 128. Hence, when the coil of the relay is energized and closes its normally-open switch contacts, the relay remains energized until the switch 154 is opened.

The switch 156, the normally-open contacts of the relay 142, and the coil of the latter are connected into a holding circuit for the relay 142 via conductors 152, 170, 172, and 144. Hence, when the coil of the relay 142 is energized and closes its normally-open contacts, the relay remains energized until the switch 156 opens.

Figure 3:
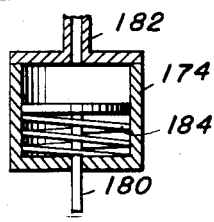
Figure 3 is an enlarged vertical section view of the pneumatic cylinder and plunger employed for damping movements of the scale beam.

An important feature of my present invention is the provision of means associated with the scale for eliminating the possibility of prematurely indicating a filled bag, discontinuing the flow of material, and the releasing of a bag from its suspended position on the hopper. This means comprises a cylinder 174 disposed in a vertical position over the outer end 176 of the scale beam. The cylinder 174 is attached in such vertical position to the bridge 72 of the scale by a bracket 178 and is provided with a depending plunger 180 having a short stroke. The cylinder is supplied with operating fluid from one of the conduits 118, via a conduit 182, to force the plunger downwardly, against a retracting spring 184 (Figure 3), to a point closely adjacent the scale beam 34. When the solenoid valve 122 is energized, the plunger is forced down.

At a predetermined point in the filling cycle (presently described) the pressure in the cylinder 174 is relieved and the spring 184 will begin to move the plunger 180 upwardly. An adjustable choke valve 186 is connected into the conduit 182, however, so that the pressure in the cylinder 174 decreases very slowly, and the rate of upward movement of the plunger 180 is so adjusted and controlled that the lower end of the same will remain in close adjacency to the end 176 of the scale beam 34 as the latter rises at a normal rate toward the end of the filling cycle. The operation of the plunger during a bag-loading cycle will become apparent during the following description.

Initially, in the operation of the machine the electrical circuits will be in the position shown in Figure 2, with the switches 154 and 156 closed and with the contacts of the relays 134 and 142 open. Therefore, no current flows to the solenoid valves 120 and 122, and the piston rods of the power cylinders 82 and 88 are retracted and the rod of the cylinder 102 is extended to maintain the bag clamps 56 open and the filling valve 12 closed. The plunger 180 of the air cylinder 174 at this time will be in a retracted position under the influence of spring 184.

The mouth of an empty bag is then slipped over the lower end 48 of the filling hopper 40 and held in such a position while the operator momentarily depresses the push-button switch 136, illustrated in Figure 2. The closing of this switch 136 energizes the relays 134 and 142, via conductors 138 and 140, and 150 and 152, respectively, thus, closing their contacts and energizing the solenoid valves 120 and 122 via the conductors 128, 130, and 132 and conductors 144, 146, and 148, respectively. Energization of the solenoid valves operates the power cylinders 82 and 88 to extend their piston rods and the cylinder 102 to retract its piston rod, thus, fully opening the filling valve 12 and setting the bag clamps 56 to retain the bag in suspended and supported position on the hopper 40. As the relays 134 and 142 are self-energized by the holding circuits, previously described, the filling valve 12 will remain open and the bag clamps 56 set, even though the operator releases the push-button switch 136, until the holding circuits are interrupted by the opening of the switches 154 and 156.

It is also to be noted that as solenoid valve 122 is actuated the operating fluid will flow to the cylinder 174 via conduit 182 to extend the plunger 180 into close adjacency with the scale beam 34 to prevent any sudden movements of the latter resulting from sudden surges of material through the valve 12 into the bag being filled. The clearance between the lower end of the plunger 180 and the outer end 176 of the scale beam 34 is such as to permit the beam 34 to rock normally about the pivots 36 in a counterclockwise direction to pivot the indicator arm 76 in an upward direction to the point 164. At this point unless the pressure in the cylinder 174 is relieved the plunger will engage the end 176 of the beam 34 and prevent further rocking movement. When the indicator arm reaches the position or point 164, the switch 156 will open, however, thus breaking the holding circuit of relay 142 and deenergizing the solenoid valve 122. Upon deenergization of solenoid valve 122, the piston rod 84 of the power cylinder 82 retracts to the position shown in dotted lines in Figure 1, to thereby partially close the filling valve 12 and change the flow of material from the spout 10 from full to dribble. This slowing before rapid cut-off of the flow of material from the spout 10 results in extreme accuracy in the weight of material loaded into the bag.

Also, upon deenergization of the solenoid valve 122, the pressure of the operating fluid on the plunger 180 through line 182 will be relieved, and the spring-pressed plunger 180 will begin to rise at a rate controlled by the fluid-bleeding choke valve 186 in line 182. The rise of the plunger 180 under the influence of spring 184 against the decreasing fluid pressure will be adjusted so as to cause the lower end thereof to be maintained slightly above the scale beam end 176 as the latter slowly rises with dribble flow into the bag. Hence, the plunger remains in a position to prevent erratic movement of the beam, as may result from a sudden surge in the rate of material flow into a bag.

Thereafter, the normal filling of the bag will continue at a dribble rate until the indicator arm 76 reaches the position 162, whereupon the corresponding opening of the switch 154 will deenergize the relay 134 interrupting the holding circuit of the same. Deenergization of the relay 134 immediately opens its contacts to thereby deenergize the solenoid valve 120 and cause the power cylinder 88 to retract its piston rod 92 to rapidly close the filling valve 12 and prevent further discharge of material into the bag.

Deenergization of the solenoid valve 120 also operates the power cylinder 102 to extend its piston rod 104 to release the bag clamps 56 so that the loaded bag falls a short distance to the floor 68, where it may be removed and its mouth tied by an operator. Thereafter, the aforementioned loading cycle is repeated upon an operator's positioning an empty bag on the hopper and again closing the push-button switch 136.

The foregoing operation relates, for the most part, to the filling of a bag under normal conditions. However, certain unusual filling conditions are frequently encountered which, in the absence of the scale damping means of my invention, would present a problem beyond the ability of a single operator to rectify. The arching or bridging of material in the supply bin or discharge spout and the breaking-down of such bridge or arch and resultant sudden surge of material into the scale-supported hopper and container creates a force which, absent the plunger 180, would tilt the scale beam 34 so far as to open both switches 156 and 154 and inactivate both of the holding circuits almost simultaneously, to thus cause premature closing of the filling valve 12 and release of a partially-filled bag.

The scale damping means of my invention avoids the possibility of the above situation occurring, however, and operates as follows: As material flows into the scale-supported hopper 40 and bag, progressively filling the same, the outer end 176 of the scale beam 34 begins to rise. If at any time in the filling cycle before the indicator arm 76 reaches the point 164 on the scale, a sudden surge of material into the bag causes the scale beam 34 to tilt rapidly, such tilting movement is stopped by engagement of the end 176 of the beam 34 against the extended plunger 180, to thereby positively prevent opening of the switch 154, which would effect complete closing of the valve 12 and the release of the bag clamps 56. Of course, if the end of the scale beam 176 is thus swung so far as to engage the extended end of the plunger 180, the switch 156 will be open, to thus cause the flow to be reduced from full to dribble. Accordingly, if the bag is not yet anywhere near fully loaded, the operator may push the push button 136 to reopen the filling valve 12 from dribble to full flow.

Although a sudden surge of material from the filling valve 12 is unlikely during dribble flow therethrough, in the event that such a surge takes place, the end of the slowly-retracting plunger 180 will again be contacted by the end 176 of the scale beam to prevent premature opening of the switch 154, corresponding closing of the filling valve 12, and release of the bag clamps 56.

It thus will be seen that the objects of this invention have been fully and effectively accomplished. The embodiment of my invention herein presented effects weighing and loading of bags or other similar receptacles with a desired weight of material automatically achieving a degree of accuracy, which in the past has presented a time-consuming and tedious problem. It will be realized, however, that the embodiment described and illustrated for the purpose of disclosing the principles of the invention is susceptible to various changes without departing from such principles. Therefore, this invention embraces all modifications encompassed by the spirit and scope of the following claims.

I claim:

1. In an automatic weighing and loading machine including material-feeding means, an open-bottom hopper positioned to receive material from the feeding means, means for releasably suspending a container from the hopper in position therebeneath to receive material discharged thereunto, scale means supporting the hopper, and means responsive to movement of the scale means occasioned by a predetermined weight of material in a container suspended from the hopper for simultaneously stopping the feeding means and releasing the suspending means, the combination of means engageable by the scale means for preventing movement thereof sufficient to operate the movement-responsive means, and means responsive to movement of the scale means occasioned by a weight of material in the container approaching the predetermined weight for rendering said movement-preventing means ineffective.

2. In an automatic weighing and loading machine including means for feeding material at normal and dribble rates, an open-bottom hopper positioned to receive material from the feeding means, means for releasably suspending a container from the hopper in position therebeneath to receive material discharged thereinto, scale means supporting the hopper, means responsive to movement of the scale means occasioned by a predetermined weight of material in a container suspended from the hopper for simultaneously stopping the feeding means and releasing the suspending means, and means responsive to movement of the scale means occasioned by a predetermined weight of material in the container less than the first-mentioned predetermined weight for changing the operation of the feeding means from normal to dribble rate, the combination of means engageable by the scale means for preventing movement thereof sufficient to operate the first-mentioned movement responsive means, and means responsive to movement of the scale means occasioned by the second-mentioned predetermined weight for rendering said movement-preventing means ineffective.

3. An automatic weighing and loading machine comprising: a gravity-discharge bin spout; a valve for controlling discharge from said spout; an open-bottom hopper positioned to receive material from said spout; means for releasably suspending a container from said hopper in position therebeneath to receive material discharged thereinto; manually-actuable means for simultaneously opening said valve and actuating said suspending means; means responsive to a predetermined weight of material in a container suspended from said hopper for simultaneously closing said valve and releasing said suspending means; means responsive to a material weight in said container approaching said predetermined weight for partially closing said valve; and means rendered ineffective by an approaching weight in said container for positively preventing the closing of said valve and the releasing of said suspending means by sudden material surges before said approaching weight of material has been loaded into the container.

4. An automatic weighing and loading machine comprising: a gravity-discharge bin spout; a valve for controlling discharge from said spout; a weighing scale for supporting a container in position to receive material discharged from said spout; means responsive to a predetermined weight of material in the container for closing said valve; and means rendered ineffective by a weight in the container approaching said predetermined weight for positively preventing the closing of said valve by a sudden surge of material into the container before said approaching weight of material has been loaded thereinto.

5. An automatic weighing and loading machine as set forth in claim 4, wherein the weighing scale includes a moving scale beam and the means for preventing the closing of the valve comprises a fluid pressure operated plunger positioned to engage said beam.

6. An automatic weighing and loading machine as set forth in claim 4, wherein the weighing scale includes a moving scale beam and the means for preventing the closing of the valve comprises a fluid pressure operated plunger engageable by the beam, and means for relieving the pressure operating said plunger as the material in the container approaches the predetermined weight.

7. An automatic weighing and loading machine comprising: a gravity-discharge bin spout; a valve for controlling discharge from said spout; a weighing scale for supporting a container in position to receive material discharged from said spout; means responsive to a predetermined weight of material in the container for partially closing said valve as the material approaches a greater predetermined weight; means responsive to the greater predetermined weight of material in the container for completely closing said valve; and means rendered ineffective by said predetermined weight of material in the container for positively preventing the closing of said valve by a sudden surge of material into the container before said predetermined weight of material has been loaded thereinto.

8. An automatic weighing and loading machine as set forth in claim 7, wherein the weighing scale includes a moving scale beam and the means for preventing the closing of the valve comprises a fluid pressure operated plunger retractable along and within the path of movement of said beam preventing sudden movement thereof which may result from sudden surges of material into the container.

9. An automatic weighing and loading machine as set forth in claim 7, wherein the weighing scale includes a moving scale beam and the means for preventing the closing of the valve comprises a fluid pressure operated plunger engageable by the beam and effective upon the partial closing of said valve for preventing the complete closing of said valve by sudden material surges before the container has been completely loaded.

10. An automatic weighing and loading machine comprising: a valve attached to the open end of a gravity discharge bin spout for controlling the flow of material therefrom, an open-bottom hopper positioned beneath said spout for receiving material flowing therefrom, releasable clamping elements for supporting a bag on said hopper in position therebeneath to receive material flowing thereinto, and a weighing scale including a moving scale beam supporting said hopper to weigh material in the bag; power cylinders for opening and closing the filling valve and for setting and releasing the bag clamps, a source of fluid pressure for actuating the cylinders, solenoid valves for controlling the supply of fluid pressure to said cylinders, electrical circuits including a pair of weight responsive switches carried by said scale and successively operated by the movement of the beam during the filling of a bag and a pair of relays each respectively actuated by one of said switches for controlling the actuation of said solenoid valves, the first of said electrical circuits being responsive to one of said switches upon a predetermined weight of material in the bag to actuate a solenoid valve and supply fluid for partially closing said filling valve, a second of said electrical circuits being responsive to the actuation of a second electrical switch upon a predetermined weight of material in the bag greater than the first-mentioned weight to actuate the other solenoid valve and supply fluid for completely closing said filling valve and releasing the bag clamps; and a scale dampening means for preventing untimely operation of the weight-responsive switches, the resultant premature closing of said filling valve and the release of the bag from the hopper including a fluid-operated plunger extensible along and within the path of movement of said moving scale beam to a point in close adjacency therewith during the initial stages of filling a bag and retractable along and within the path of movement of said beam under the influence of a spring operating against an adjustably decreasing pneumatic pressure during the final stage of filling a bag.

11. In an automatic weighing and loading machine as set forth in claim 10, the combination of a manually-operated switch for energizing said electrical circuits for controlling the flow of fluid pressure to the power cylinders to open said filling valve, actuate the clamping means to support a bag on the hopper and to extend the plunger of the scale dampening means into close adjacency with the scale beam and within the path of movement of said beam.

12. An automatic weighing and loading machine comprising: material-feeding means; a weighing scale including a scale beam for supporting a container in position to receive material from said feeding means; means responsive to a predetermined weight of material in the container for stopping operation of said feeding means; means including a retractable stop engageable by said scale beam for preventing actuation of said weight-responsive means by sudden surges of material from said feeding means; and means responsive to a predetermined weight of material in the container less than said first-mentioned predetermined weight for slowly retracting said stop.

13. An automatic weighing and loading machine comprising: material-feeding means operable at normal and dribble rates; a weighing scale including a scale beam for supporting a container in position to receive material from said feeding means; means responsive to a predetermined weight of material in the container for stopping operation of feeding means; means including a retractable stop engageable by said scale beam for preventing actuation of said weight-responsive means by sudden surges of material from said feeding means; and means responsive to a predetermined weight of material in the container less than said first-mentioned predermined weight for slowly retracting said stop and changing the operation of said feeding means from normal to dribble rate.

14. An automatic weighing and loading machine comprising: material feeding means; an open-bottom hopper positioned to receive material from said feeding means; means for releasably suspending a container from said hopper in position thereneath to receive material discharged thereinto; manually-actuable means for simultaneously starting said feeding means and actuating said suspending means; means including a scale beam responsive to a predetermined weight of material in a container suspended from said hopper for simultaneously stopping operation of said feeding means and releasing said suspending means; means including a retractable stop engageable by said scale beam for preventing actuation of said weight-responsive means by sudden surges of material from said feeding means; and means responsive to a predetermined weight in the container less than said first-mentioned predetermined weight for slowly retracting said stop.

15. An automatic weighing and loading machine comprising: material-feeding means operable at normal and dribble rates; an open-bottom hopper positioned to receive material from said feeding means; means for releasably suspending a container from said hopper in position thereneath to receive material discharged thereinto; manually-actuable means for simultaneously starting said feeding means for operation at normal rate and actuating said suspending means; means including a scale beam responsive to a predetermined weight of material in a container suspended from said hopper for simultaneously stopping operation of said feeding means and releasing said suspending means; means including a retractable stop engageable by said scale beam for preventing actuation of said weight-responsive means by sudden surges of material from said feeding means; and means responsive to a predetermined weight in the container less than said first-mentioned predetermined weight for slowly retracting said stop and changing the operation of said feeding means from normal to dribble rate.

16. In an automatic weighing and loading machine including a valve controlling flow from a gravity-discharge bin spout into a weighing container, the combination comprising: a lever; an extensible member having one end thereof pivotally connected to one end of said lever; a second extensible member pivotally connected to the other end of said lever; a link connecting said lever between its ends to the valve for operating the latter by pivotal movements of said lever; and power-operated means responsive to the weight of material in the container for operating said members successively to move the valve to dribble position as the material approaches a predetermined weight and to move the valve to closed position as the material reaches the predetermined weight.

17. The structure defined in claim 16 in which the members comprise piston rods of power cylinders, one of said cylinders being fixed and the other pivotally mounted.

18. The structure defined in claim 16 wherein the point of pivotal connection of one of the members to said lever is nearer than the other to the point of pivotal connection of the link to said lever.

19. An automatic weighing and loading machine for loading a predetermined weight of material into a container comprising: a support for a weighing container; controllable means for feeding material into a container supported on said support; means responsive to a predetermined weight of material in the weighing container supported on said support for stopping operation of said feeding means; and means rendered ineffective by a weight of material in the container approaching said predetermined weight for positively preventing the stopping of said feeding means by a sudden surge of material therefrom into the container before said approaching weight of material has been loaded into the latter.

20. An automatic weighing and loading machine for loading a predetermined weight of material into a container comprising: a weight-responsive support for a weighing container; controllable means for feeding material at normal and dribble rates into the container supported on said support; means responsive to a predetermined weight of material in the container for stopping operation of said material-feeding means; means responsive to a predetermined weight of material in the container less than said first-mentioned predetermined weight for changing the operation of said feeding means from normal to dribble rate; and means rendered ineffective by said second-mentioned predetermined weight of material in the container for positively preventing the stopping of said feeding means by a sudden surge of material into the container before said second-mentioned predetermined weight of material has been loaded into the container.

References Cited in the file of this patent

UNITED STATES PATENTS

| | | | |
|---|---|---|---|
| 1,892,729 | Hallwood | Jan. 3, | 1933 |
| 2,008,305 | Johnson | July 16, | 1935 |
| 2,011,608 | Belknap | Aug. 20, | 1935 |
| 2,100,874 | Ryan | Nov. 30, | 1937 |
| 2,193,709 | Bottger | Mar. 12, | 1940 |
| 2,264,562 | Bryant | Dec. 2, | 1941 |
| 2,345,287 | Peterson | Mar. 28, | 1944 |
| 2,466,386 | Curioni | Apr. 5, | 1949 |
| 2,502,380 | Howard | Mar. 28, | 1950 |
| 2,544,155 | Harkenrider | Mar. 6, | 1951 |
| 2,546,193 | Lindstaedt | Mar. 27, | 1951 |
| 2,549,704 | Noble | Apr. 17, | 1951 |
| 2,633,349 | Williams | Mar. 31, | 1953 |
| 2,634,080 | Knobel | Apr. 7, | 1953 |
| 2,790,619 | Schachte | Apr. 30, | 1957 |
| 2,817,488 | Capell | Dec. 24, | 1957 |